June 25, 1957 H. E. ALTGELT 2,796,817
ADJUSTABLE HITCH MECHANISM FOR TRACTOR-MOUNTED PLOWS
Original Filed Sept. 2, 1950 3 Sheets-Sheet 1
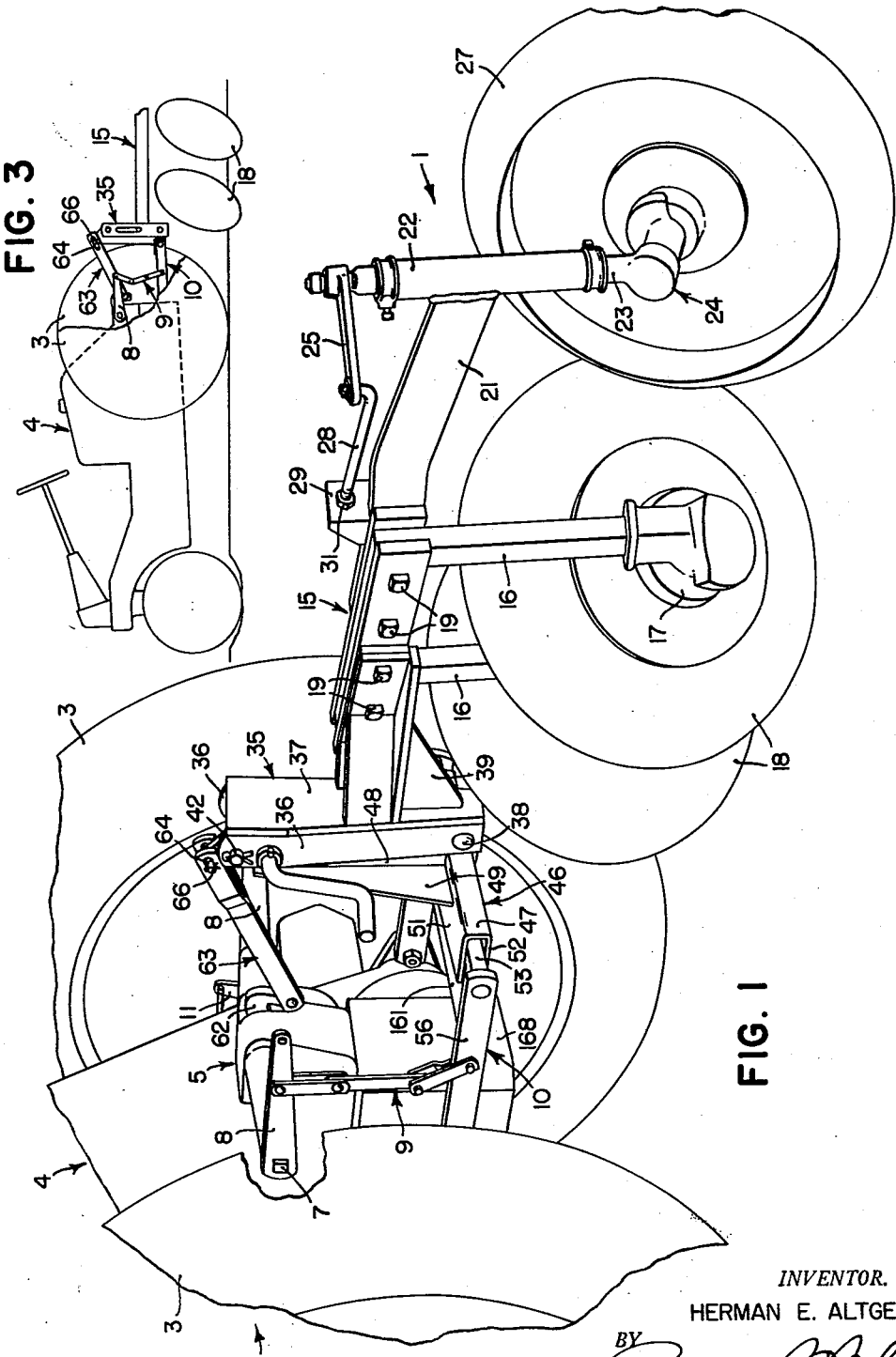
*INVENTOR.*
HERMAN E. ALTGELT
BY
ATTORNEYS June 25, 1957　　　H. E. ALTGELT　　　2,796,817
ADJUSTABLE HITCH MECHANISM FOR TRACTOR-MOUNTED PLOWS
Original Filed Sept. 2, 1950　　　3 Sheets-Sheet 2
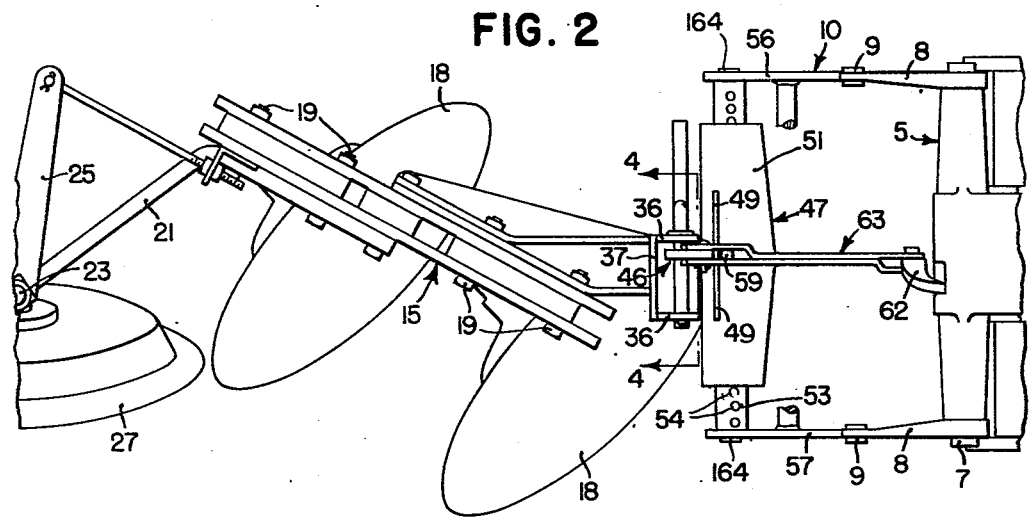
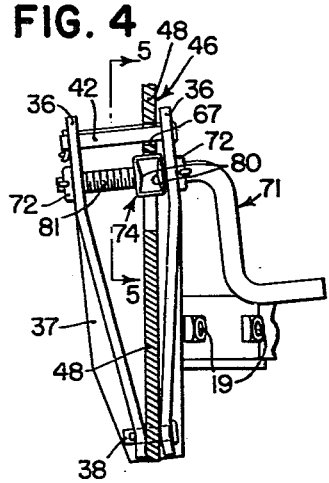
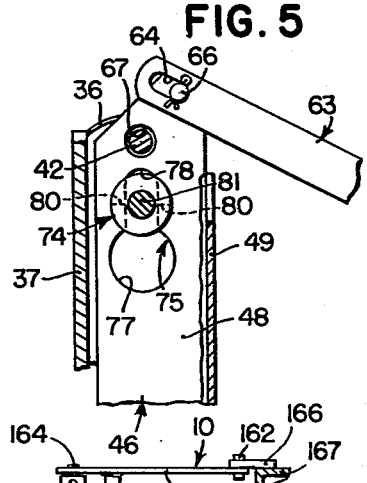
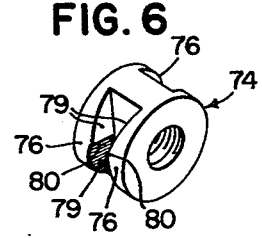
INVENTOR.
HERMAN E. ALTGELT
BY
ATTORNEYS

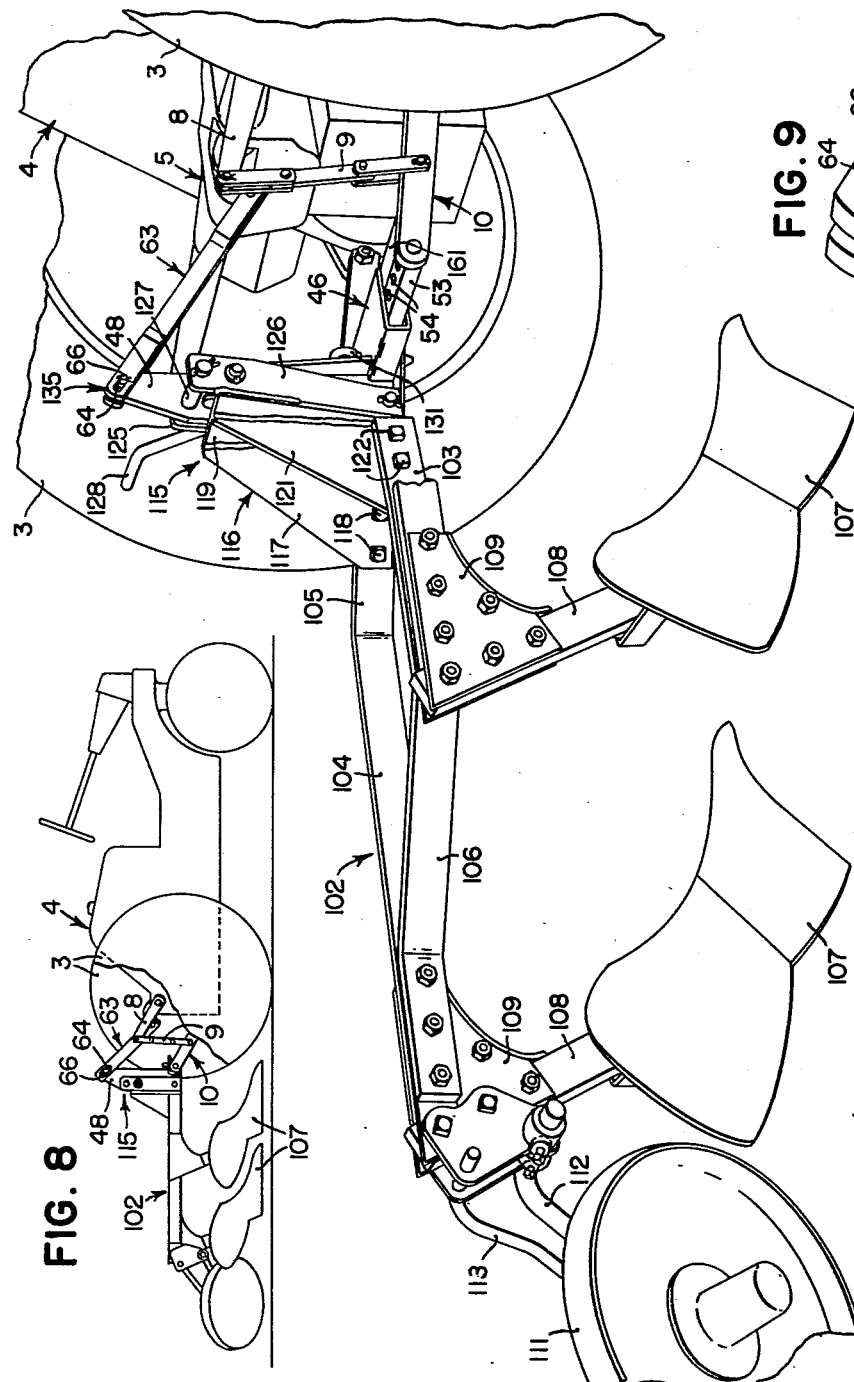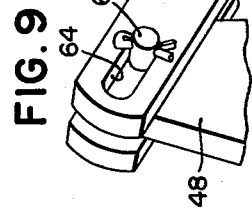

United States Patent Office 2,796,817
Patented June 25, 1957

2,796,817

ADJUSTABLE HITCH MECHANISM FOR TRACTOR-MOUNTED PLOWS

Herman E. Altgelt, Moline, Ill., assignor to Deere & Company, Moline, Ill., a corporation of Illinois Continuation of application Serial No. 183,017, September 2, 1950. This application February 17, 1956, Serial No. 566,136

12 Claims. (Cl. 97—47.52)

The present invention relates generally to agricultural implements and more particularly to implements that are adapted to be mounted on a tractor and raised, lowered and controlled by means on or driven by the tractor.

The object and general nature of the present invention is the provision of a tractor-mounted implement and means operated by the rockshaft of the tractor power lift unit for both adjusting the depth of operation of the implement and raising the latter into its transport position. More particularly, it is a feature of this invention to provide lifting and controlling connections arranged with lost-motion means whereby the implement remains substantially unaffected by variations in the position of the tractor relative to the implement, as when the rear wheels of the tractor run over a ridge or the front wheels pass into a depression or the like. Further, it is an important feature of this invention to provide means incorporated in the connections between the implement and the tractor facilitating the leveling of the implement relative to the tractor.

An additional feature of this invention is the provision of an agricultural implement of the type in which groundworking tool means is connected with the tractor through vertically swingable, generally parallel link means, affording a virtual hitch point well forward of the points of actual connection of the implement with the tractor, in connection with means providing a lost-motion connection in the upper link, whereby the latter is enabled to transmit all compressive forces encountered in normal operation but which does not abruptly raise the rear end of the implement if perchance the front wheels of the tractor should drop into a ditch, depression or the like or the rear wheels of the tractor pass over a ridge or hump while the outfit is in operation.

These and other objects and advantages of the present invention will be apparent to those skilled in the art after a consideration of the following detailed description, taken in conjunction with the accompanying drawings, in which:

Figure 1 is a perspective view of a tractor-mounted disk plow in which the principles of the present invention have been incorporated.

Figure 2 is a plan view of the disk plow shown in Figure 1.

Figure 3 is a diagrammatic view showing the action of an implement, constructed according to the principles of the present invention, maintaining substantially the desired depth of operation even though the front wheels should, for example, pass into a depression, such as a dead furrow or the like.

Figure 4 is a sectional view, taken along the line 4—4 of Figure 2, showing the mechanism for leveling the plow laterally.

Figure 5 is an enlarged fragmentary sectional view taken along the line 5—5 of Figure 4.

Figure 6 is a perspective view of the crank screw actuated adjustable abutment forming a part of the lateral leveling mechanism shown in Figure 4.

Figure 7 is a perspective view showing the principles of the present invention embodied in a two-bottom moldboard tractor carried plow in which the entire plow is lifted and carried entirely on the tractor during transport.

Figure 8 is an enlarged fragmentary perspective showing the rear end of the compression or upper link in this form of the invention.

Figure 9 is a diagrammatic view, somewhat similar to Figure 3, showing the implement in this form of the invention in its raised or transport position.

Figure 10 is a detail view of a novel tractor drawbar construction.

Referring now to the drawings, the implement, which is indicated by the reference numeral 1, is shown as connected to a farm tractor 2, which is of conventional construction so far as the present invention is concerned. The tractor 2 includes front wheel means and rear wheel means 3 driven by a power plant 4 of any suitable construction, which also energizes a power-actuated mechanism 5 of the type generally referred to as a power lift. The mechanism 5 includes a transversely disposed rockshaft 7 carrying power lift arms 8 fixedly connected at the ends of the rockshaft 7, the outer ends of the power lift arms 8 being connected by lost-motion or normally slack link means 9 with the drawbar 10 of the tractor. The drawbar 10 of the tractor is connected for generally vertical swinging movement about a transverse axis relative to the tractor, and the power lift unit 5 is constructed substantially the same as that shown in U. S. Patent 2,477,710, issued August 2, 1949 to Charles C. Worstell, to which reference may be made if necessary. By means disclosed and claimed in the patent just mentioned, the power lift rockshaft 7 may be rocked progressively in controlled increments in the raising direction by operating a control arm 11 in the desired amount and direction, the rockshaft 7 then moving a corresponding amount in that direction.

According to the principles of the present invention I provide a tractor-carried implement 1 so constructed and arranged that the operating depth of the implement may be adjusted or varied by movement of the rockshaft 7 through a range of movement which corresponds to the slack position of the lifting links 9, movement of the rockshaft 7 beyond that position acting through the drawbar 10 to raise at least the front end of the implement toward its transport position. The means provided for this purpose will be referred to later in detail.

The implement 1 is constructed in the form of a disk plow having a generally diagonally extending beam structure 15 to which the upper portions of a pair of disk standards 16 are adjustably connected. The lower portion of each standard 16 carries suitable bearing units 17 by which rotatable furrow opening disks 18 are operatively connected with the standards 16. The upper ends of the standards 16 are bent forwardly and secured, as by bolts 19, to the beam structure 15. A rear frame extension 21 is secured to and forms a part of the beam structure 15 and at its rear end carries a generally vertically extending sleeve 22 in which the spindle portion 23 of a rear furrow wheel axle 24 is disposed for movement about a generally vertical axis. An arm 25 is fixed to the upper end of the spindle 23 and the lower end of the axle structure 24 carries a relatively heavy rear furrow wheel 27. The outer end of the arm 25 is apertured to receive the rear end of a link 28 which at its forward end is threaded and extended through an apertured bracket 29 secured to the plow frame 15. A threaded end of the link 28 carries lock nuts 31 by which the position of the arm 25 may be varied and adjusted, as desired, to vary or adjust the angle of lead of the rear furrow wheel 27.

A vertical frame section 35 is fixed to and forms a part of the plow frame structure 15, the section 35 including a pair of downwardly converging bars 36 welded at their rear edges to a strut section 37. The lower ends of the two bars 36 are apertured to receive a transverse hitch pin 38, the lower portion of the strut 37, below the main portion of the frame 15, being reenforced by a gusset plate 39. The upper ends of the downwardly converging bars 36 are apertured to receive a transverse pin or bolt 42 which is held in place by a cotter or the like. A vertically disposed frame part 46 is connected to and forms a part of the frame structure 15 through the pivot bolt 38 mentioned above. The frame part 46 includes a lower, transversely disposed, generally U-shaped socket member 47 and an upwardly extending plate section 48 which is disposed in a vertical fore and aft extending plane and welded at its lower end to the socket member 47. The lower end of the vertical plate 48 is apertured to receive the hitch pin 38. The vertical plate 48 is reenforced by a pair of lateral gussets 49.

The U-shaped socket member 47 includes vertically spaced sections 51 and 52 which are spaced apart so as to receive therebetween a transverse drawbar member 53, which, according to the principles of the present invention, is provided with a plurality of apertures 54 and is pivotally connected at its ends to rear portions of the side arms 56 and 57 of the tractor drawbar 10. A hitch pin 59 is extended through apertures in the upper and lower members 51 and 52 of the socket member 47 and through a selected aperture in the drawbar member 53, the parts being arranged so that when the socket member 47 is connected through the pin 59 with the bar 53, there is some clearance between the rear edge of the bar 53 and the adjacent or bight portion of the U-shaped socket member 47, as will be seen from Figure 1, whereby the implement 1 may swing laterally relative to the tractor, particularly the drawbar 10 thereof. Details of the novel tractor drawbar 10 will be described later.

As best shown in Figure 1, a depth-adjusting or controlling arm 62 is fixed to the generally central portion of the rockshaft 7 and extends generally downwardly and rearwardly with respect to the power lift arms 8. The lower end of the depth-adjusting arm 62 is apertured to receive the forward end of a compression link structure 63, the latter being pivotally connected by any suitable pivot pin or the like to the outer end of the controlling arm 62. The rear end of the compression link 63 is slotted, as at 64, the slots 64 thereof receiving a pivot pin 66 which connects the rear end of the compression link 63 to the upper end of the forward frame part 46. The vertical plate portion 48 of the front frame part 46 is apertured below the pin 66, as at 67 (Figures 4 and 5), to receive the transverse pin 42. The transverse pin 42 and the portions of the vertical plate 48 receiving it serve to prevent any pivoting in a vertical plane of one frame part relative to the other about the axis of the lower hitch pin 38, but the parts associated with the hitch pin 38 provide sufficient looseness so that the rear frame part, carrying the disks 18, may be pivoted or tilted laterally relative to the front frame part 46 about a generally fore and aft extending axis.

Means is provided for adjusting the laterally tilted position of one frame part relative to the other, and such means comprises a crank screw 71 extending through apertures in the downwardly converging frame bars 36 and held in place therein by a pair of collars 72. The threaded portion 81 of the crank screw 71 receives a nut member 74 that is rockably mounted in the upper portion of a keyhole-type aperture 75 formed in the upper portion of the front frame plate 48. The nut member is formed with a pair of opposed abutments 76 at each side shaped to accommodate relative rocking movement of the nut member 74 with respect to the plate member 75 about an axis which passes generally centrally through the threaded portion of the crank screw 71. The nut member 74 is mounted in place in the front frame plate section 48 by first inserting the nut member 74 in the larger portion 77 of the aperture 75, and then shifting the nut member 74 upwardly until the narrow portion 78 of the aperture 75 is disposed between the two sets of abutments 76. The angled wall portions 79 of the abutment sections 76 are shaped so that in any position of the rear frame part relative to the front frame part the contact between the nut member 74 and the plate section 48 takes place with substantially line contact, as at 80, against the abutments 76 which, as mentioned above, lie on opposite sides but substantially in the horizontal plane of the axis of the threaded portion of the crank screw 71. Therefore, there is little if any tendency for side thrusts transmitted between the frame parts causing the nut member 74 to bind on the threaded portion of the crank screw 71.

The operation of the implement described above is substantially as follows.

Figure 1 shows the implement in operating position, in which it will be noted that the furrow openers 18 lie well below the transverse pivot axis of the connection 38 between the front end of the frame structure 15 and the rear portion of the tractor drawbar 10. Normally, therefore, the pressure of the soil, or the soil resistance, tends to cause the implement frame to rock upwardly and forwardly about the aforesaid axis. This, however, is resisted by the link 63 acting in compression, the normal position of the parts being that in which the pivot 66 presses forwardly against the forward end of the slot 64, the forward end of the link 63 being pivoted to the depth-adjusting arm 62. Since the drawbar 10, which serves as a lower link, and the compression links 63, which serves as an upper link, are free to pivot upwardly, and also downwardly within the limits of the slack in the chains or links 9, the implement as a whole swings generally vertically about a virtual hitch point which lies well forward of the tractor, generally at the point of convergence of the upper and lower links 63 and 10. If, however, the front end of the tractor should drop into a depression, such as a dead furrow or the like, or the rear wheels of the tractor pass over a ridge or hump, which ordinarily would cause the links 9 to tighten and hence act through the drawbar 10 to abruptly lift the rear end of the implement from the ground, the pin 66 moves rearwardly in the slot 64, which thus permits the rear end of the implement to remain on the ground while the wheels of the tractor pass over the depressions and ridges. In this way, the tractor 2 may oscillate generally vertically, either at its front or rear end, without materially affecting the position of the plow. Since in normal operation, the pin 66 lies at the forward end of the slot 64, the presence of the latter, which allows the tractor to tilt as aforesaid without changing the position of the plow, is of no disadvantage, for normally the soil resistance causes the pin 66 to lie at the front end of the slot 64. Moving the rockshaft 7 into different positions during normal operation acts through the upper or compression link 63 to change the position of the implement, causing it to operate at an increased or decreased depth, according to whether the rockshaft 7 is operated in a direction to move the end of the adjusting arm 62 downwardly and forwardly, or upwardly and rearwardly. The lifting chains 9 are normally slack during operation, the depth of operation being determined by the position of the rear furrow wheel 27 and the position, in a generally fore-and-aft direction, of the lower end of the arm 62 and the forward end of the link 63, variations of which, as by rocking of the shaft 7, act to shift the virtual hitch point, which lies at the intersection of the lines of the links 63, 56 and 57 extended, of the implement.

In the implement described above, the furrow openers are disks and, as is well known, disk plows and similar machines usually require a fairly heavy rear furrow wheel in order to give the implement sufficient penetration to enter the ground promptly when beginning a furrow. In such implements it is not desirable to raise the rear end of the implement off the ground when lifting the implement into its transport position. However, it is ordinarily entirely feasible to lift other types of implements entirely clear of the ground with the ordinary power lift means of the tractor, because there is no necessity of having the rear end of such implement heavily weighted as in disk plows and the like.

Referring now to Figures 7 et seq., the implement shown may readily be entirely lifted off the ground for transport purposes and the like by the power lift of the tractor, and in illustrating this form of the invention I have shown a two-bottom plow 101 connected to the same tractor described above in connection with the disk plow shown in Figures 1–6. Parts that are identical with those described above will be indicated by the same reference numerals.

The two-bottom plow 101 comprises a plow frame structure 102 which includes a right-hand beam 103, a left-hand beam 104 and suitable diagonal braces 105 and 106. Plow bottoms 107 are fixed to the lower ends of standards 108 which are rigidly connected to the rear ends of the plow beams 103 and 104 by connecting brackets 109, which are largely conventional, so far as the present invention is concerned. A rear furrow wheel 111 is mounted at the lower and rear end of a supporting crank axle 112, the position of which relative to the frame of the plow may be varied, as desired, by an adjusting link 113.

The plow frame 102 includes at its forward end an upwardly extending frame structure 115 which includes a plate section 116 bent so as to form a rearward brace section 117 bolted to the brace member 105 at 118, by bolts or the like, and a transverse vertically extending plate section 119 which is reenforced by a second bracing section 121 which is welded at its forward end to the transverse plate section 119 and fastened to the plow beam 103 by any suitable means, such as bolts 122. Secured, as by welding, to the forward side of the vertically extending transverse plate section 119 is a pair of upwardly diverging vertical bars 125 and 126 which are apertured to receive an upper connecting pin 127 which is substantially the same as the corresponding part 42 described above. Below the pin 127 the bars 125 are apertured to receive a crank screw 128 which is also substantially the same as described above and held in place against lateral displacement relative to the bars 125 and 126 by the same collar and pin means. The lower ends of the bars 125 and 126 are apertured to receive a hitch pin 131 by which the vertically extending structure 115 is connected to a vertical frame section 135 which preferably is substantially the same as the vertical frame structure 46 described above, and which is connected with the tractor by the same socket member and link structure described in detail above, and hence further description here is unnecessary.

The operation of the plow just described is substantially the same as that of the disk plow described above, except that when the power lift unit is operated to raise the implement into its transport position, the front end of the plow frame 102 is raised first, until the attaching pin 66 reaches the rear end of the slot 64, after which further raising movement transmitted to the tractor drawbar 10 raises both the front and rear ends of the implement so that the latter entirely clears the ground, as shown in Figure 9.

The present invention, as embodied in either of the plows described above, is particularly adapted for use with a tractor having the drawbar construction indicated in its entirety by the reference numeral 10 and referred to briefly above. As will be seen particularly in Figure 10, the tractor drawbar 10 has the side arms 56 and 57 interconnected rigidly by a solid cross member 161, the ends of which are rigidly fixed, as by welding, to the side arms 56 and 57 at points a short distance ahead of the pivoted hitch member 53. Since the side arms 56 and 57 are rigidly tied together, the drawbar 10 as a whole is a rigid part or member. The forward ends of the side arms 56 and 57 are apertured to receive pivot studs 162 by which the drawbar 10 is connected with the tractor for vertical swinging movement relative thereto about the transverse axis defined by the studs 162. This provides a drawbar construction with which implements may easily and conveniently be connected so as to be held by the drawbar against lateral tilting, or lateral swinging movement under transversely directed forces. The present construction, therefore, makes it unnecessary to interconnect the implement with some other part of the tractor, such as the transverse power lift shaft, thereby relieving the power lift shaft of such loads. At the same time, the extension of the side arms of the drawbar rearwardly of the rigid interconnecting bar 161 and the arrangement and construction in which the transverse hitch member 53 is pivoted, as at 164, to the rear ends of the side arms 56 and 57, makes it very easy and simple to connect the hitch structure of various implements to the tractor through the tractor drawbar 10 and, by virtue of the pivoting of the hitch member 53 in the drawbar side arms, up-and-down swinging of the implement relative to the tractor is readily accommodated. The forward ends of the tractor drawbar side arms 56 and 57 are shown as pivoted, as at 162, to rearwardly extending lugs 166 on the sides 167 of the differential housing, but it will be understood that a tractor drawbar, such as the one described above and indicated by the reference numeral 10, may, if desired, be pivotally connected with some other part or portions of the tractor.

While the implement shown in Figures 1–6 has been described as supported on the rear furrow wheel 27 for transport, it will be understood that by properly proportioning the slot 64 and the range of operation of the lifting mechanism, the implement 1 may be raised entirely off the ground for transport, in much the same manner as the plow 101, provided the rear wheel 27 is not too heavy.

In both forms of the invention described above, the plow is free to swing laterally relative to the tractor, not only by virtue of the pivoting of the hitch member 46 to the hitch bar 53 by the pivot 59, but also by virtue of the connection of the plow frame through the hitch pin 38 to the vertical section 48 of the front hitch structure, this connection affording some looseness which, together with a certain amount of looseness between the pin 42 and nut member 74 relative to the plate 48, provides an amount of lateral swinging of the implement relative to the tractor in addition to that provided by the permissive swinging of the hitch structure 46 relative to the tractor drawbar 53. Thus, a plow or other implement incorporating the principles of the present invention is especially adapted for contour work and other operations where relatively unhampered maneuverability is desirable.

While I have shown and described above the preferred structure in which the principles of the present invention have been incorporated, it will be understood that my invention may be embodied in types of implements other than described specifically above. For example, the disk plow is representative of any implement in which there is a rear support which is in contact with the ground, both in the operating and in the transport positions, whereas the second form of the invention described above is representative of any implement in which the entire implement is raised relative to and carried entirely by the tractor during transport. For example, instead of a plow having two moldboard-type furrow openers, only one furrow opener may be employed, or the ground-engaging means may be in the form of a disk harrow, either the offset type or the single- or double-action type, as desired.

Therefore, what I claim and desire to secure by Letters Patent is:

1. An agricultural implement adapted to be attached to a tractor of the type having a drawbar including a transversely extending section, said implement comprising a frame having two parts interconnected for relative movement about a generally fore and aft extending axis, one of said frame parts having a lower drawbar-receiving section and a second section extending upwardly therefrom, means for hitching said one frame part to the transverse section of said drawbar so as to be held against lateral tilting relative to the tractor, ground engaging means connected to the other frame part, said one frame part being swingable generally vertically relative to the tractor and said other part having a forwardly disposed section extending upwardly alongside said above-mentioned second section, means acting between the latter section and said forwardly disposed section for changing the position of one frame part relative to the other about said fore and aft extending axis so as to provide for leveling the implement by changing its position relative to the tractor, and a compression member connected at its rear end with the upper end of said second section and adapted to be connected at its forward end with the tractor above the drawbar.

2. For use with a tractor of the type having a generally vertically swingable drawbar and power actuated means for swinging said drawbar, including a rockshaft, means for controllably rocking the latter through successive increments, and arm means fixed to said rockshaft and having a lost-motion connection with said drawbar, the combination with an arm adapted to be fixed to said rockshaft at an intermediate point of an implement comprising frame means including a generally rearwardly extending part and an upwardly extending part, means for pivotally connecting the forward end of said rearwardly extending frame part to said drawbar for generally vertical movement relative thereto about a transverse axis, and a compression link means pivotally connecting the upper end of said upwardly extending frame part with said last mentioned arm and adapted to swing said implement frame relative to said drawbar about said transverse axis by rocking movement of said rockshaft before the lost motion in said lost motion connection has been taken up by upward movement of said arm means.

3. The invention set forth in claim 2 further characterized by said frame part being interconnected for relative movement about a fore and aft extending axis, and means for tilting one frame part laterally about said fore and aft extending axis relative to the other frame part.

4. The invention set forth in claim 3, further characterized by said compression link including lost motion means whereby after said power actuated means has been actuated to take up the lost motion means in the connection between said arm means and said drawbar, further operation of said power actuated means serves to raise only the front end of said frame until the lost motion in said compression link has been taken up, after which further operation of the power actuated means serves to raise both ends of the implement means relative to the tractor.

5. An agricultural implement adapted to be connected with a tractor of the type having a generally vertically swingable drawbar, power actuated means for swinging said drawbar, including a rockshaft, means for controllably rocking the latter through successive increments, arm means fixed to said rockshaft and having a lost-motion connection with said drawbar, and a depth adjusting arm fixed to said rockshaft at an intermediate point, said implement comprising frame means including a generally rearwardly extending part and an upwardly extending part, means for pivotally connecting the forward end of said rearwardly extending frame part to said drawbar for generally vertical movement relative thereto about a transverse axis, and a compression link means pivotally connecting the upper end of said upwardly extending frame part with said last mentioned arm and adapted to swing said implement frame relative to said drawbar about said transverse axis by rocking movement of said rockshaft before the lost motion in said lost motion connection has been taken up by upward movement of said arm means.

6. A plow adapted to be connected with a tractor of the type having a generally vertically swingable drawbar, power actuated means for swinging said drawbar including a rockshaft, means for controllably rocking the latter through successive increments, arm means fixed to said rockshaft and having a lost-motion connection with said drawbar, and a depth adjusting arm fixed to said rockshaft at an intermediate point, said plow comprising frame means including a generally rearwardly extending part and an upwardly extending part, means for pivotally connecting the forward end of said rearwardly extending frame part to said drawbar for generally vertical movement relative thereto about a transverse axis, and a compression link means pivotally connecting the upper end of said upwardly extending frame part with said last mentioned arm and adapted to swing said implement frame relative to said drawbar about said transverse axis by rocking movement of said rockshaft before the lost motion in said lost motion connection has been taken up by upward movement of said arm means.

7. A hitch device comprising a generally transversely disposed socket member having a drawbar-receiving socket and a generally vertically extending plate section arranged to lie in a generally fore-and-aft extending vertical plane, frame means connected at its forward lower portion with said socket member and having a forward generally vertically extending section disposed alongside said first section and including a pair of laterally spaced apart bars disposed generally vertically and on opposite sides of said plate section, and adjusting member carried by said bars, and means connected with said plate section and said adjusting member and operated by movement of the latter to shift said frame means relative to said socket member.

8. A hitch device comprising a generally transversely disposed socket member having a drawbar-receiving socket and a generally vertically extending section fixed at its lower portion to said socket member, frame means connected at its forward lower portion with said socket member and having a forward generally vertically extending section disposed alongside said first section, said last mentioned vertically extending section including spaced apart members disposed generally on opposite sides of said first mentioned vertical section, the latter being apertured, a transverse part extending through the aperture in said apertured section and connected at its ends to said spaced apart members, and an adjusting member carried by one section and connected with the other section for changing the position of said frame means relative to said socket member.

9. A hitch device comprising a generally transversely disposed socket member having a drawbar-receiving socket and a generally vertically extending plate section arranged to lie in a generally fore-and-aft extending vertical plane, said plate section having a pair of apertures in its upper portion, frame means connected at its forward lower portion with the lower end of said plate section for lateral pivoting and having a forward generally vertically extending section disposed alongside said first section, the latter section including a pair of laterally spaced apart bars disposed generally vertically and on opposite sides of said plate section, a transverse part extending through one of the apertures in said plate section and fixed at its end portions to said laterally spaced apart bars, a nut member carried in the other of said apertures, and a screw threaded adjusting member extending through said nut member and turnably connected at its end portions with said laterally spaced apart bars.

10. For use with a tractor of the type having a generally vertically swingable drawbar and power actuated means for swinging said drawbar, including a rockshaft, means for controllably rocking the latter through successive increments, and arm means fixed to said rockshaft and having a lost-motion connection with said drawbar, the combination with an arm adapted to be fixed to said rockshaft, of an implement comprising frame means including a generally rearwardly extending part and an upwardly extending part, means for pivotally connecting the forward end of said rearwardly extending frame part to said drawbar for generally vertical movement relative thereto about a transverse axis, and a compression link means pivotally connecting the upper end of said upwardly extending frame part with said last mentioned arm and adapted to swing said implement frame relative to said drawbar about said transverse axis by rocking movement of said rockshaft before the lost motion in said lost-motion connection has been taken up by upward movement of said arm means.

11. For use with a tractor of the type having a generally vertically swingable drawbar and power actuated means for swinging said drawbar, an agricultural implement comprising frame means and means for connecting said frame means with said drawbar for movement relative thereto about a generally transverse axis, an upper link member adapted to be pivotally connected at its upper end with the tractor at a point above said drawbar, and means including a pin and elongated slot type of connection between the rear end of said upper link means and the implement at a point above said axis, said pin and slot connection comprising a slot in the rear portion of said upper link and extending generally longitudinally thereof, a pin freely movable in a generally fore-and-aft direction in said slot, and means connecting said pin with the implement, the distance between the forward end of said slot and a point of pivotal connection of the upper link with the tractor being such that when the tractor is generally horizontal in operation, said implement is also generally horizontal, said slot accommodating a free rearward movement of the pin when the tractor tilts forwardly relative to the implement.

12. For use with a tractor of the type having a generally vertically swingable drawbar and power actuated means for swinging said drawbar, an agricultural implement comprising frame means and means for connecting said frame means with said drawbar for movement relative thereto about a generally transverse axis, an upper link member adapted to be pivotally connected at its upper end with the tractor at a point above said drawbar, and means connecting the rear portion of said upper link member with the implement at a point generally above said axis, said last mentioned connecting means including a part connected with the implement and having a lost-motion connection with said upper link member and means spaced apart longitudinally of said upper link member to limit the amount of relative movement between said part and said upper link member, the distance between said spaced apart means being such that when the tractor is generally horizontal in operation and said upper link member is under compression said implement is also generally horizontal, said spacing accommodating a free rearward movement of said part relative to said upper link member when said drawbar is raised, said spacing being sufficient to accommodate an upward tilting of the implement until the rearward relative movement of said part is terminated, said part being movable freely relative to said link member during the range of said lost motion.

References Cited in the file of this patent

UNITED STATES PATENTS

| | | |
|---|---|---|
| 1,526,972 | Ferguson | Feb. 17, 1925 |
| 1,529,425 | Ferguson | Mar. 10, 1925 |
| 2,273,875 | Livesey et al. | Feb. 24, 1942 |
| 2,320,141 | Kott | May 25, 1943 |
| 2,322,342 | Bunn | June 22, 1943 |
| 2,335,510 | Hansen | Nov. 30, 1943 |
| 2,341,807 | Olmstead et al. | Feb. 15, 1944 |
| 2,346,757 | Horner | Apr. 18, 1944 |
| 2,347,898 | Ferguson | May 2, 1944 |
| 2,351,473 | Benjamin | June 13, 1944 |
| 2,405,980 | Sands et al. | Aug. 20, 1946 |
| 2,453,390 | Werner | Nov. 9, 1948 |
| 2,475,078 | Cherry | July 5, 1949 |
| 2,483,565 | Strandlund | Oct. 4, 1949 |
| 2,503,522 | Struthers et al. | Apr. 11, 1950 |
| 2,531,768 | Cline et al. | Nov. 28, 1950 |
| 2,551,870 | Bridger, Jr. | May 8, 1951 |